US005868331A

United States Patent [19]

Shinohara et al.

[11] Patent Number: 5,868,331

[45] Date of Patent: Feb. 9, 1999

[54] BAIL MOUNTING STRUCTURE FOR SPINNING REEL FOR FISHING

[75] Inventors: Eiji Shinohara, Tokyo; Tomoyuki Amano, Saitama, both of Japan

[73] Assignee: Daiwa Seiko, Inc., Tokyo, Japan

[21] Appl. No.: 813,875

[22] Filed: Mar. 7, 1997

[30] Foreign Application Priority Data

Mar. 7, 1996 [JP] Japan .................................... 8-079560
Aug. 21, 1996 [JP] Japan .................................... 8-238525

[51] Int. Cl.[6] .................................... A01K 89/01

[52] U.S. Cl. .................................... 242/231

[58] Field of Search .................................... 242/230, 231, 242/232, 233

[56] References Cited

U.S. PATENT DOCUMENTS

| | | | |
|---|---|---|---|
| 2,728,534 | 12/1955 | Wallace . | |
| 3,670,984 | 6/1972 | Lemery | 242/231 |
| 4,171,108 | 10/1979 | Ishida et al. | 242/231 |
| 4,874,144 | 10/1989 | Murakami | 242/230 |
| 4,884,761 | 12/1989 | Kuntze | 242/235 |
| 5,149,006 | 9/1992 | Hitoml | 242/231 |
| 5,261,627 | 11/1993 | Shinohara | 242/231 |
| 5,673,867 | 10/1997 | Takeuchi | 242/231 |

FOREIGN PATENT DOCUMENTS

| | | | |
|---|---|---|---|
| 1096590 | 6/1955 | France | 242/231 |
| 1238987 | 12/1960 | France . | |
| 1506359 | 3/1968 | France . | |
| 1-60670 | 4/1989 | Japan . | |
| 3-79660 | 8/1991 | Japan . | |

*Primary Examiner*—Katherine Matecki
*Attorney, Agent, or Firm*—Sughrue, Mion, Zinn, Macpeak & Seas, PLLC

[57] ABSTRACT

A bail mounting portion (6) of a spinning reel for fishing includes a securing projected portion (6*b*), and a semi-annular and hollow bail (7) includes a securing recessed portion (7*c*) formed in one side end portion (7*a*). The securing recessed portion (7*c*) of the bail (7) is fitted with the securing projected portion (6*b*) of the bail mounting portion (6) by pressure. With this structure, the bail (7) can be surely fixed to the bail mounting portion (6), and thus the function of a fishing line guide device can be maintained stably for a long time.

11 Claims, 17 Drawing Sheets

A
5
6
3
7
15
7a
6b
7
12
7a
3
13
2d
11
2a
2
2b
1
10

15
6a
17
3
3a
3b
13
5
6
16
6e
7a
7c
6f
7
7
4b
7b
4e
7d
4a
4
14

BAIL MOUNTING STRUCTURE FOR SPINNING REEL FOR FISHING

BACKGROUND OF THE INVENTION

The present invention relates to a spinning reel for fishing which includes an improved fishing line guide device for guiding a fishing line to a spool.

Conventionally, a fishing line guide device used in a spinning reel for fishing is structured such that a semi-annularly-shaped bail is supported by two support arms respectively formed on the two sides of a rotor through bail support members such as an arm lever having a fishline guide portion and a bail holder in such a manner that the bail can be freely reversed from a fishing line take-up position to a fishing line play-out position or vice versa.

There are conventionally known several structures for mounting an end portion of the bail in fishing line guide devices. For example, as disclosed in Japanese Utility Model Publication No. 3-79660 of Heisei, the end portion of the bail is inserted by a given amount into a bail support member which is reversibly supported in the front portion of the support arm of the rotor. The bail end portion is fixed by means of staking in order to prevent its removal. Also, as disclosed in Japanese Utility Model Publication No. 1-60670 of Heisei, after the bail end portion is inserted, it is fixed to the bail support member by a stop ring for prevention against removal. Further, there is known a fishing line guide device as shown in FIG. 18, in which the end portion of a bail 7" is fitted into and fixed to a hole 6*q* formed in a conical-shaped projecting portion 6*p* provided in a bail mounting portion 6.

However, the mounting structure disclosed in the former publication suffers from problems in that the staking process makes the fixing strength unstable and repetition of the reversing operation over a long period of time is likely to cause clattering.

Also, in the mounting structure disclosed in the latter publication, the assembling work becomes troublesome due to use of the stop ring, the number of parts is increased, nor can the clattering be prevented positively. That is, similarly to the former structure, there are still problems left to be solved, such as the strange sensation caused by the noise (namely, a dual sound due to the clattering) produced when the bail is reversed and returned, and the like.

Further, in the conventional fishing line guide device shown in FIG. 18, since a level difference between the conical projecting portion 6*p* and the bail 7" must be filled up by means of a silver solder 18 or the like, the finishing operation is troublesome.

SUMMARY OF THE INVENTION

To solve the above-mentioned problems, the present invention provides a bail mounting structure for mounting a bail onto at least one of the bail support members in a fishing, spinning reel wherein the bail support members are pivotably supported respectively on support arms of a rotor that is rotatable in cooperation with rotation of a handle so that the bail support members are movable between a fishing line take-up position and a fishing line play-out position. The bail mounting structure is characterized by a securing recessed portion formed in an end portion of the bail. A securing projected portion is provided on a mounting portion of the bail support member and securely inserted into the securing recessed portion. An integral portion of the mounting portion of the bail support member may form the securing projected portion, or alternatively a separate member may be fixed to the mounting portion of the bail support member to form the securing projected portion.

DETAILED DESCRIPTION OF THE PREFERRED EMBODIMENTS

Figure 1:
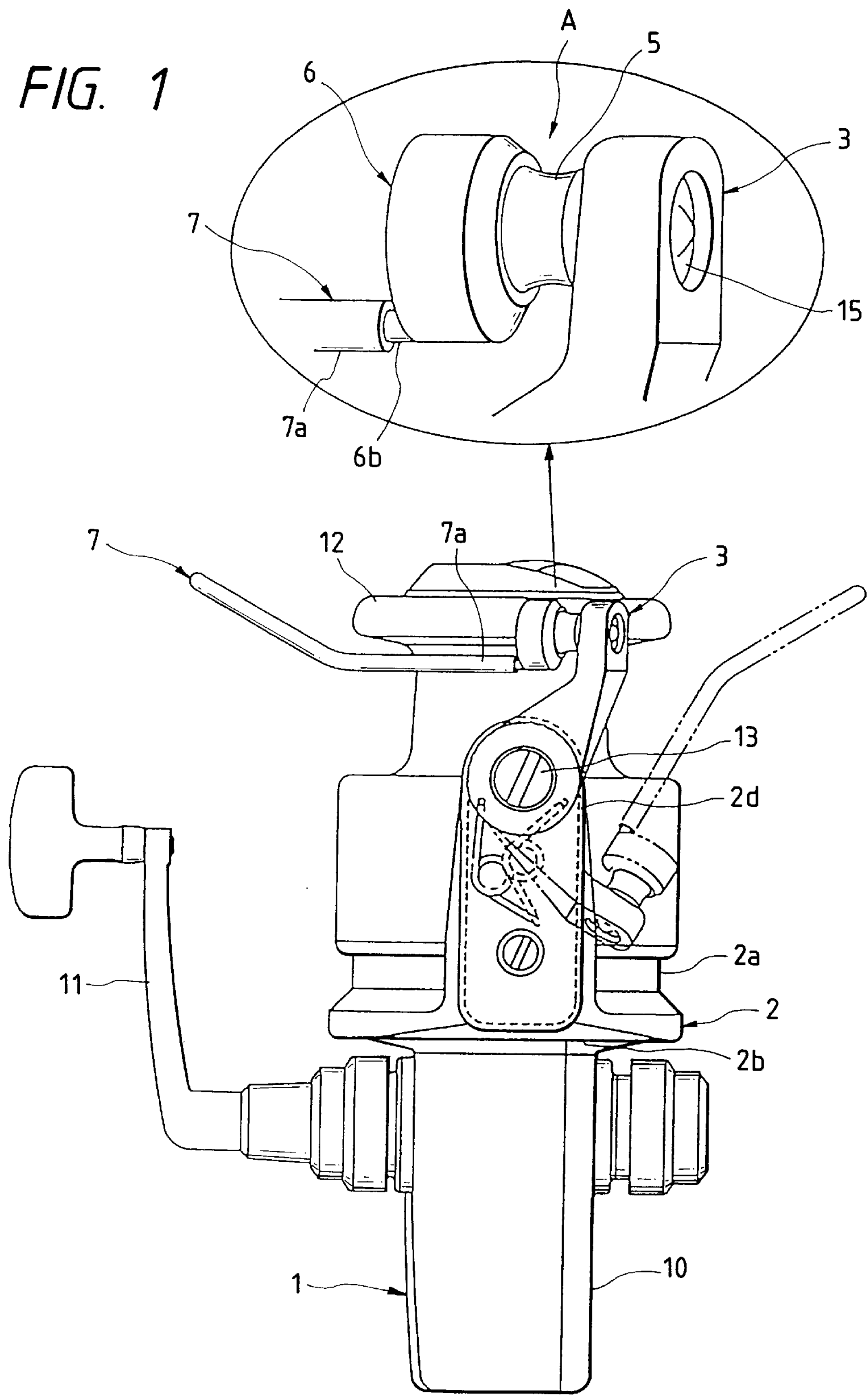
FIG. 1 is a plan view of one bail support member and a reel main body bottom portion employed in a first embodiment of a spinning reel for fishing according to the invention, and an enlarged plan view of the main portions of the above-mentioned one bail support member.
Figure 2:
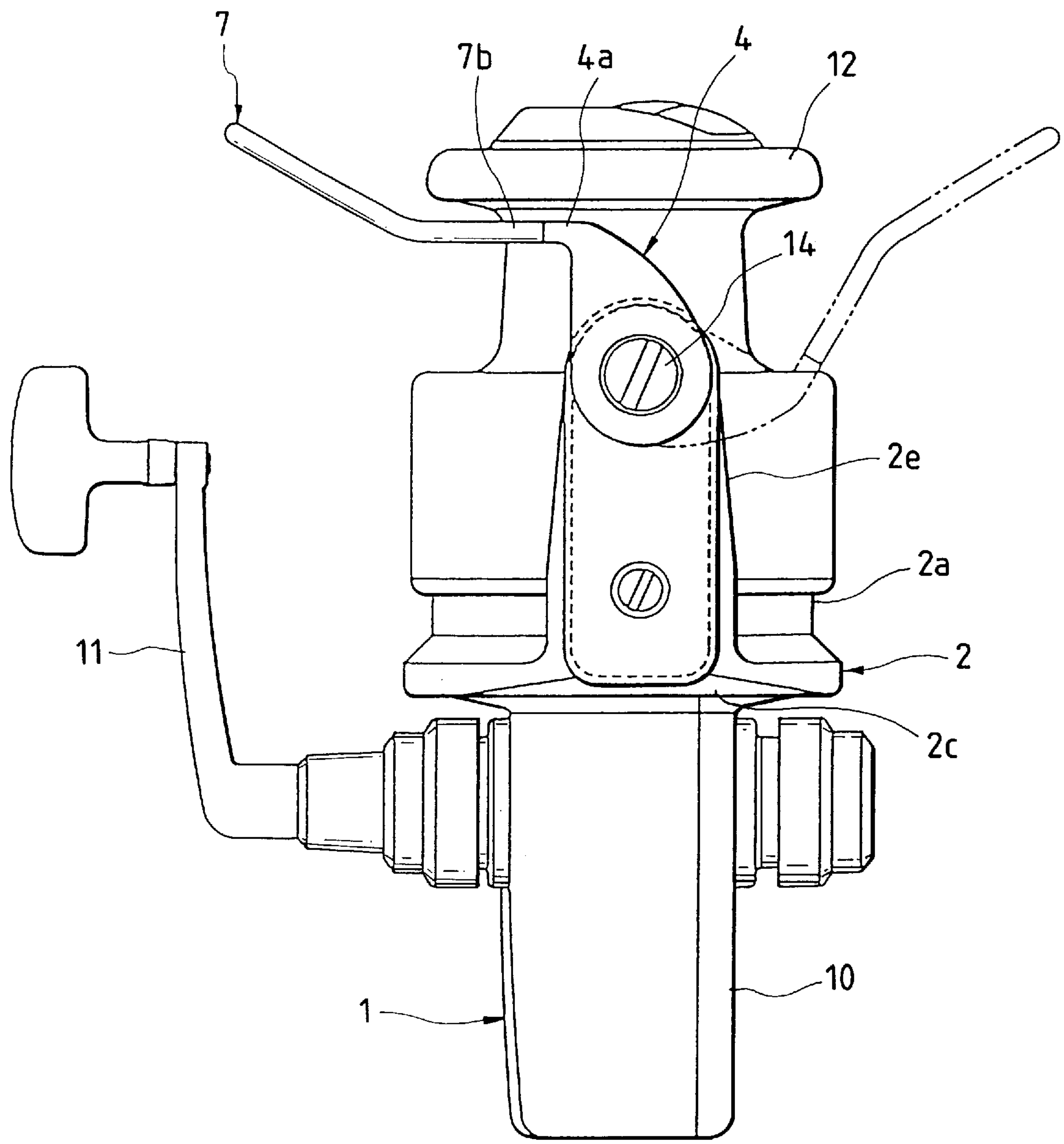
FIG. 2 is a plan view of the other bail support member and reel main body bottom portion employed in the spinning reel for fishing according to the first embodiment.
Figure 3:
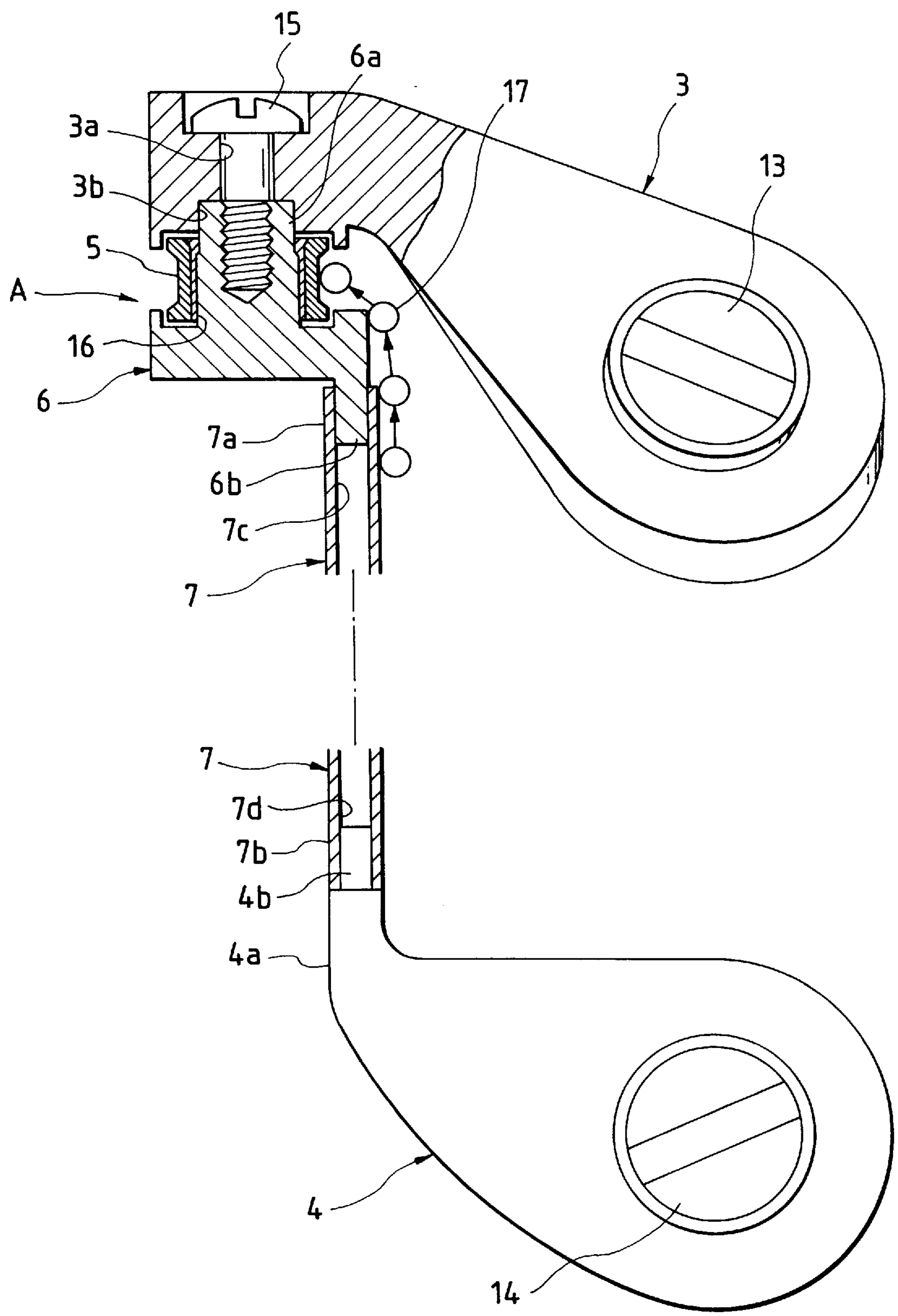
FIG. 3 is a developed sectional plan view of the main portions of a pair of bail support members employed in the first embodiment.

Now, description will be given below in detail of the invention with reference to the embodiments thereof respectively shown in the accompanying drawings. In FIGS. 1 to 3, there is shown a first embodiment of a spinning reel for fishing according to the invention. In particular, FIG. 1 is a plan view of one of the bail support members provided in the spinning reel for fishing and the bottom portion of a reel main body of the spinning reel, and an enlarged plan view of the main portions of the one bail support member. FIG. 2 is a plan view of the other bail support member of the spinning reel and the bottom portion of the reel main body thereof. FIG. 3 is a developed sectional plan view of the main portions of the pair of bail support members employed in the first embodiment.

In particular, a spinning reel for fishing according to the first embodiment of the invention comprises a reel main body 1, a rotor 2 mounted on a rotary shaft cylinder (not shown), a cover member 10 for covering the reel main body 1, a drive gear (not shown) supported within the cover member 10, a handle 11 which is mounted in such a manner that the mounting position thereof can be exchanged right and left, and a spool 12. In the present spinning reel for fishing, the rotor 2 can be rotated in conjunction with the rotational movements of the drive gear (not shown) and handle 11, and the spool 12 can be reciprocated back and forth in conjunction with the rotational movement of the rotor 2.

The rotor 2 includes a cylindrical portion 2*a* having a large diameter, while the cylindrical portion 2*a* includes base portions 2*b* and 2*c*. In the rotor 2, a pair of support arms 2*d* and 2*e* are respectively provided on the outer peripheries of the base portions 2*b* and 2*c* in such a manner that they project forwardly therefrom.

One bail support member 3 of the present fishing line guide device is reversibly supported through a screw shaft 13 in the leading end portion of one support arm 2*d*, while the other bail support member 4 of the present fishing line guide device is reversibly supported through a screw shaft 14 in the leading end portion of the other support arm 2*e*.

The one bail support member 3 and the other bail support member 4 are held at their respective fishing line take-up positions shown by solid lines when the fishing line is taken up, whereas they are reversed to their respective fishing line play-out positions shown by two-dot chained lines when the fishing line is played out.

In the present fishing line guide device, a fishing line guide roller 5 and a bail mounting portion 6 respectively belonging to a fishing line guide part A are mounted on one bail support member 3, while one side end portion 7*a* of a hollow bail 7 is mounted on the bail mounting portion 6.

The other side end portion 7*b* of the bail 7 is fixed to the front side of the other bail support member 4.

In the leading end portion of the one bail support member 3, there are formed a through hole 3*a* and a recessed portion 3*b*, while a screw 15 is inserted through the through hole 3*a* and is threadedly engaged with a screw hole formed in the shaft portion 6*a* of the bail mounting portion 6.

Also, the shaft portion 6*a* is inserted into and fitted with the recessed portion 3*b*.

Further, the fishing line guide roller 5 is rotatably fitted onto the outer periphery of the shaft portion 6*a* with a shaft cylinder 16 interposed between them.

The bail mounting portion 6 includes a securing projected portion 6*b* formed on the outside thereof.

The bail 7, which is semi-annularly shaped and hollow, includes a securing recessed portion 7*c* formed in the one side end portion 7*a* thereof. The securing recessed portion 7*c* is fitted by pressure with the securing projected portion 6*b* of the bail mounting portion 6.

The other bail support member 4 includes a laterally projecting portion 4*a* formed in the front side thereof, while an engaging or securing projected portion 4*b* in the projecting portion 4*a*.

The bail 7 further includes a securing recessed portion 7*d* formed in the other side end portion 7*b* thereof, whereby the securing recessed portion 7*d* is fitted onto the securing projected portion 4*b* of the other bail support member 4 by pressure or other similar means.

The bail mounting portion 6, bail 7 and the other bail support member 4 may be bonded together when the securing recessed portion 7*c* is fitted with the securing projected portion 6*b* and the securing recessed portion 7*d* is fitted with the securing projected portion 4*b*.

Referring now to the operation of the spinning reel for fishing according to the first embodiment of the invention, when the terminal tackles (not shown) of the spinning reel are thrown out, the bail support members 3 and 4 are held at their respective fishing line play-out positions shown by the two-dot chained lines in FIGS. 1 and 2 and a fishing line (not shown) wound around a spool 12 is played out.

After the terminal tackles are thrown out, if the rotor is rotated in accordance with the rotation of the handle 11, then the bail support member 3 strikes butted against a butting portion (not shown) provided in a leg portion (not shown) of the reel main body 1 and is thereby reversed, with the result that the bail support members 3, 4 and the bail 7 are raised up to their respective fishing line take-up positions shown by the solid lines.

At this time, as shown in FIG. 3, a fishing line 17 is picked up by the bail 7 and is then guided to the fishing line guide roller 5 of the fishing line guide part A.

If the rotor 2 is rotated in association with the rotation of the handle 11, then the fishing line can be wound around the spool 12.

In the spinning reel for fishing structured in the above-mentioned manner, since the bail mounting portion 6 and bail 7 are fixed to each other in such a manner that the securing recessed portion 7*c* of the bail 7 is fitted with the securing projected portion 6*d* of the bail mounting portion 6, there can be provided a positive and simple structure which is able to maintain the function of the present fishing line guide device stably for a long period of time without causing any clattering.

Also, the fishing line 17 picked up by the bail 7 can be positively guided to the fishing line guide roller 5 of the fishing line guide part A without being caught by the securing recessed portion 7*c* or by the securing projected portion 6*b*, so that a fishing line take-up operation can be carried out comfortably.

Figure 4:
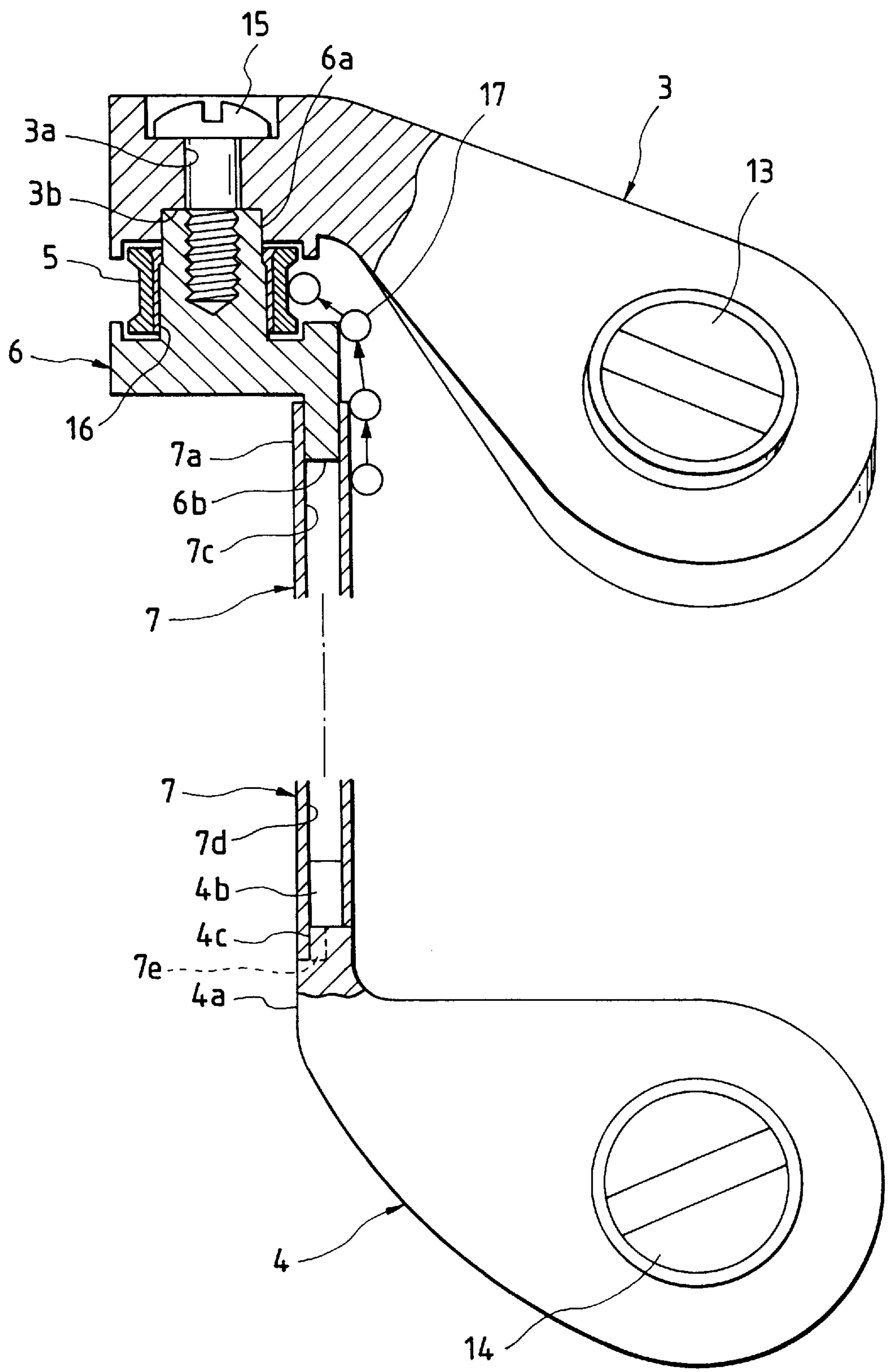
FIG. 4 is a developed sectional plan view of the main portions of a pair of bail support members employed in a second embodiment of the invention.

Now, in FIG. 4, there is shown a second embodiment of a spinning reel for fishing according to the invention. That is, FIG. 4 is a developed sectional plan view of the main portions of a pair of bail support members employed in the second embodiment.

In the second embodiment, there is formed a semi-circular protruded portion 7*e* adjacent the securing recessed portion 7*d* of the other side end portion 7*b* of the bail 7.

On the other hand, in the front side of the other bail support member 4, there is formed a projecting portion 4*a* which extends laterally. In the projecting portion 4*a*, there is formed a semi-circular recessed portion 4*c* adjacent the securing projected portion 4*b*, with which the semi-circular notch 7*e* can be fitted when the securing recessed portion 7*d* is fitted with the securing projected portion 4*b*.

The remaining portions of the second embodiment are almost the same as those of the previously described first embodiment.

Figure 5:
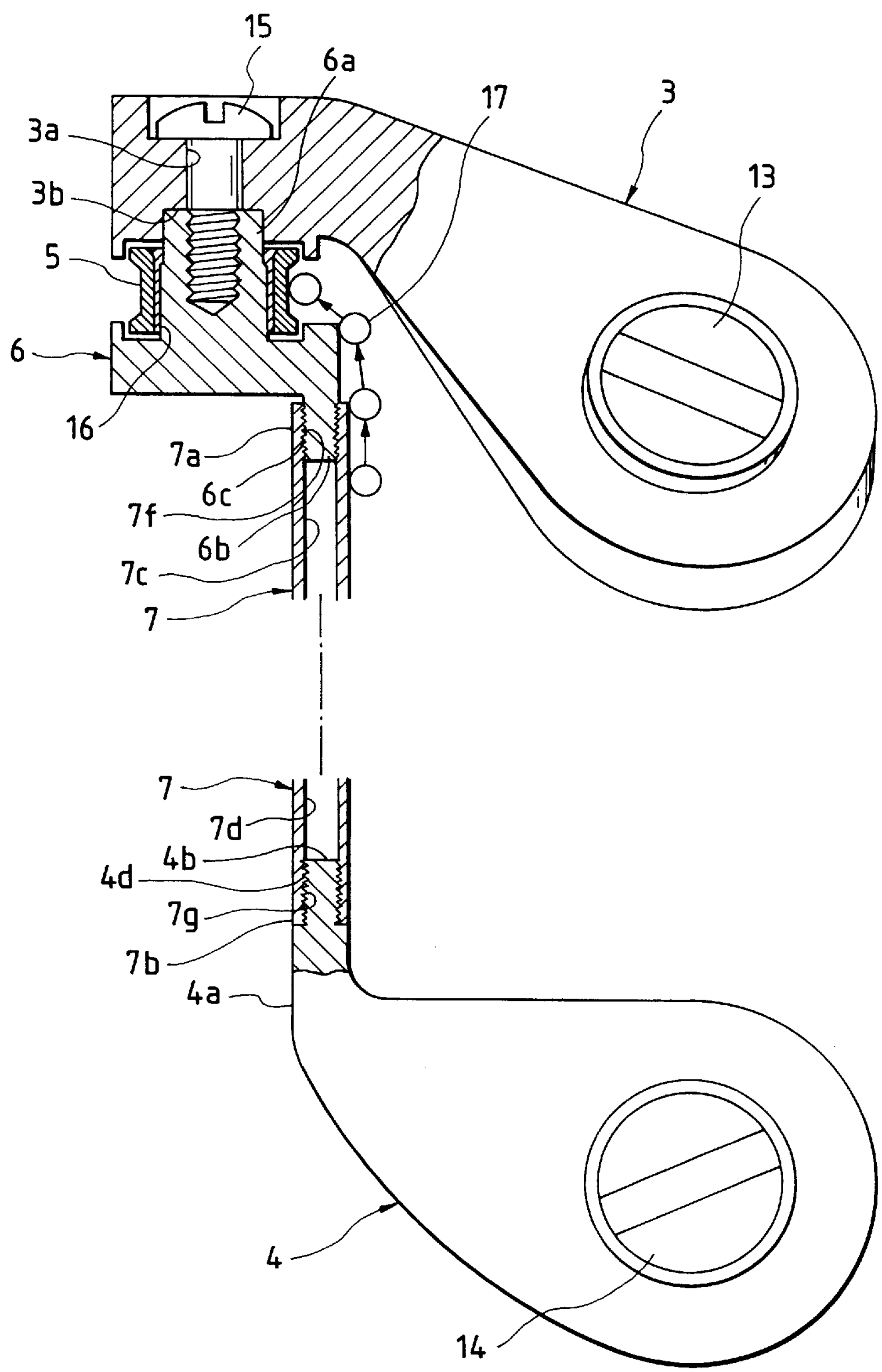
FIG. 5 is a developed sectional plan view of the main portions of a pair of bail support members employed in a third embodiment of the invention.

Now, in FIG. 5, there is shown a third embodiment of a spinning reel for fishing according to the invention. That is, FIG. 5 is a developed sectional plan view of the main portions of a pair of bail support members employed in the third embodiment.

In the third embodiment, there is formed a securing projected portion 6*b* in the outside portion of the bail mounting portion 6. On the outer periphery of the securing projected portion 6*b*, there is formed a screw portion 6*c*.

Also, in the securing recessed portion 7*c* of one side end portion 7*a* of the semi-annular hollow bail 7, there is formed a screw portion 7*f*.

In the front portion of the other bail support member 4, there is formed a laterally projecting portion 4*a*, having an engaging or securing projected portion 4*b*, with a screw portion 4*d* formed in the outer peripheral portion of the securing projected portion 4*b*.

In the securing recessed portion 7*d* of the other side end portion 7*b* of the bail 7, there is formed a screw portion 7*g*.

The screw portion 6*c* of the bail mounting portion 6 and the screw portion 7*f* of the bail 7 as well as the screw portion 4*d* of the other bail support member 4 and the screw portion 7*g* of the bail 7 are threadedly engaged with each other before the one bail support member 3 is mounted onto the leading end portion of one support arm 2*d* by the screw shaft 13 and before the other bail support member 4 is mounted onto the leading end portion of the other support arm 2*e* by the screw shaft 14.

The remaining portions of the third embodiment are almost the same as those in the previously described first embodiment.

Figure 6:
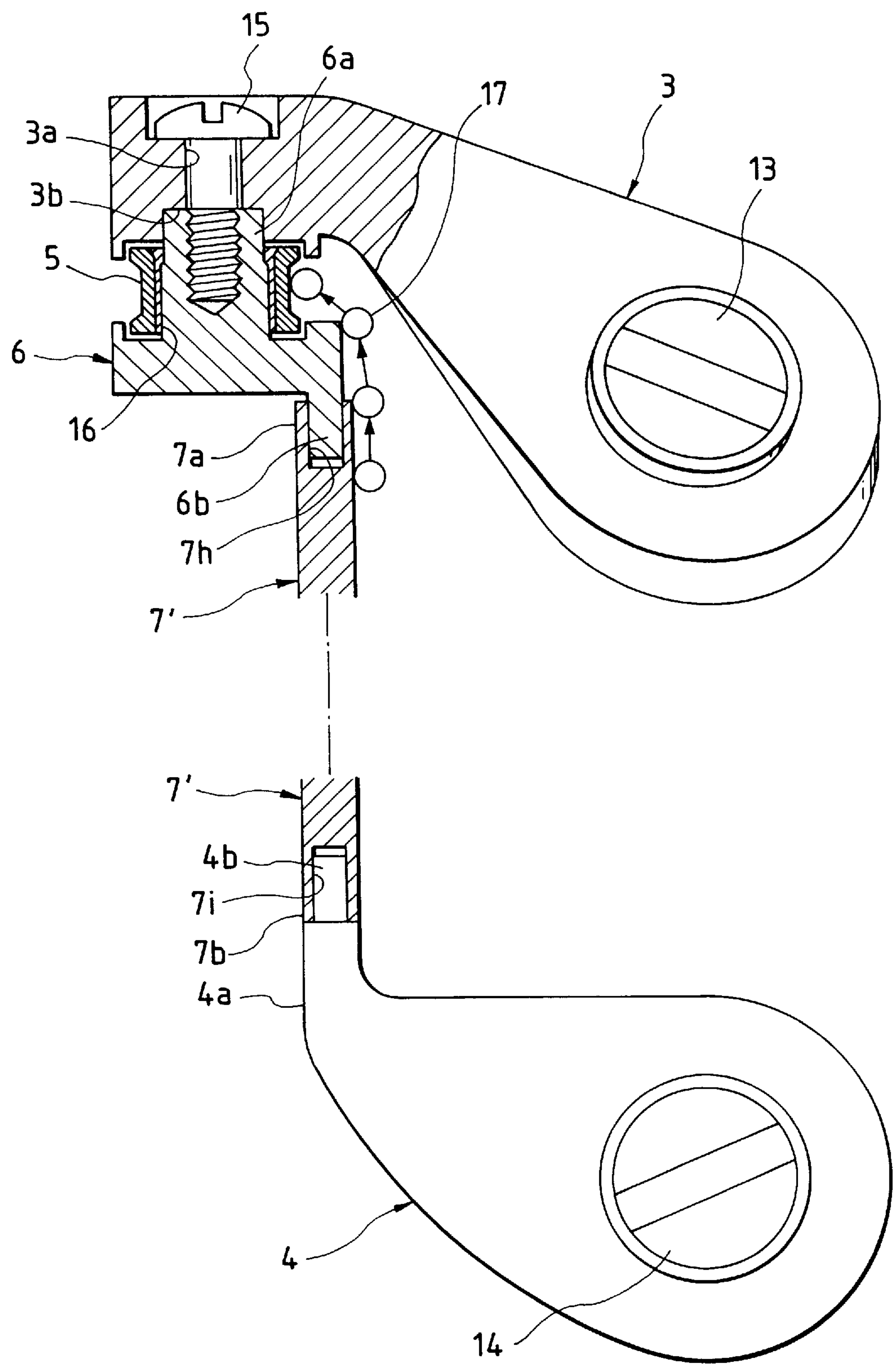
FIG. 6 is a developed sectional plan view of the main portions of a pair of bail support members employed in a fourth embodiment of the invention.

Now, in FIG. 6, there is shown a fourth embodiment of a spinning reel for fishing according to the invention. In particular, FIG. 6 is a developed sectional plan view of the main portions of a pair of bail support members employed in the fourth embodiment.

In the fourth embodiment, there is used a bail 7' which is so formed as to be solid and have a semi-annular shape.

The bail mounting portion 6 includes a securing projected portion 6*b* formed in the outside portion thereof.

The bail 7' includes a securing recessed portion 7*h* formed in one side end portion 7*a* thereof, while the securing recessed portion 7*h* is fitted by pressure or by similar means with the securing projected portion 6*b*.

The bail 7' also includes a securing recessed portion 7*i* which is formed in the other side end portion 7*b* thereof.

On the other hand, the other bail support member 4 includes a laterally projecting portion 4*a* in the front portion thereof, and an engaging or securing projected portion 4*b* formed in the projecting portion 4*a*, whereby the securing projected portion 4*b* of the other bail support member 4 is fitted with the securing recessed portion 7*i* of the bail 7' by pressure or by similar means.

The remaining portions of the fourth embodiment are almost the same as those of the previously described first embodiment.

Figure 7:
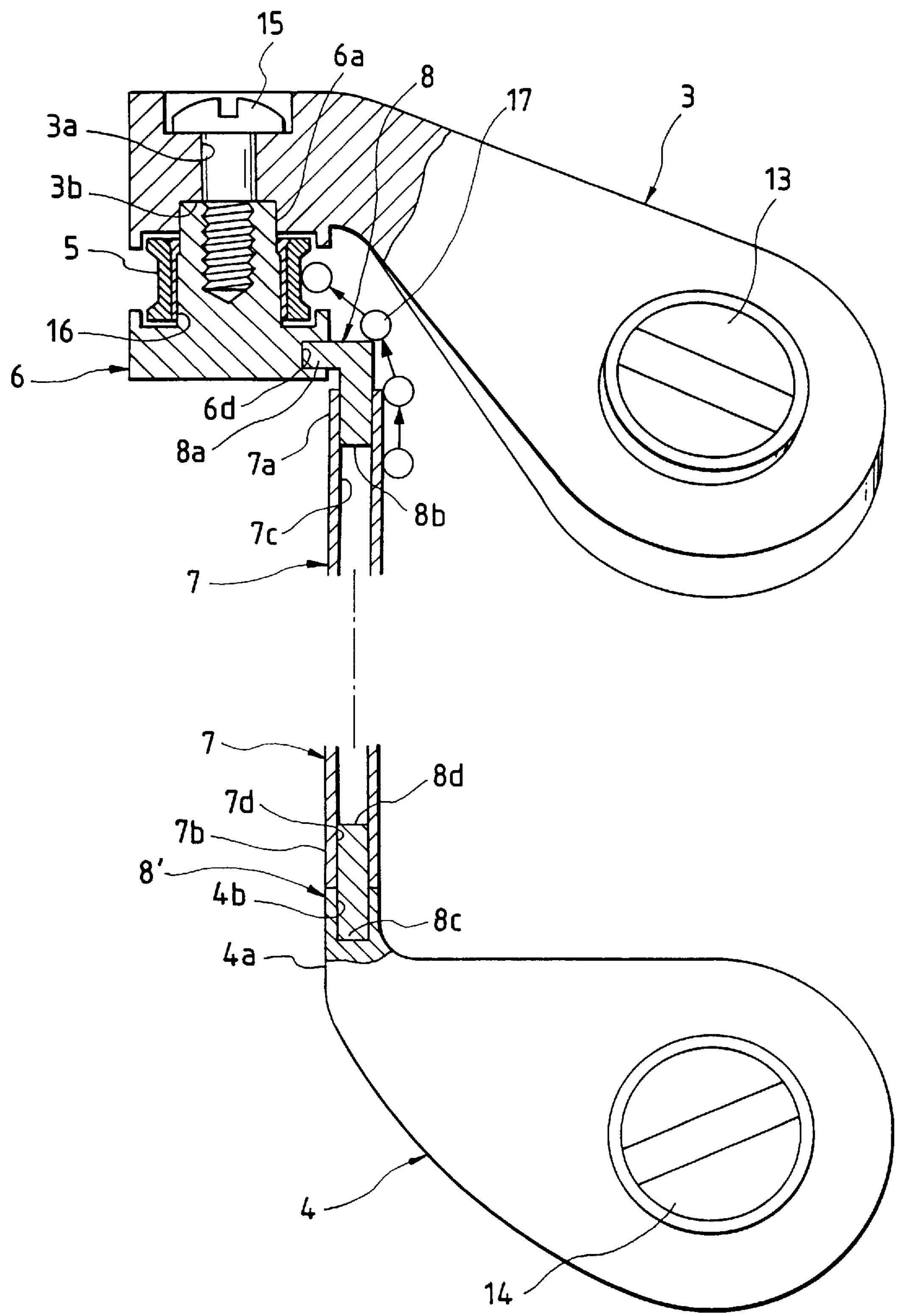
FIG. 7 is a developed sectional plan view of the main portions of a pair of bail support members employed in a fifth embodiment of the invention.

Now, in FIG. 7, there is shown a fifth embodiment of a spinning reel for fishing according to the invention. In particular, FIG. 7 is a developed sectional plan view of the main portions of a pair of bail support members employed in the fifth embodiment.

In the fifth embodiment, the bail mounting portion 6 includes a recessed portion 6*d* which is formed in the outer periphery thereof, while one side portion 8*a* of an L-shaped connecting member 8 is fitted with the recessed portion 6*d* of the bail mounting portion 6.

A bail 7, which is hollow and is formed in a semi-annular shape, includes a securing recessed portion 7*c* formed in one side end portion 7*a* thereof, such that the securing recessed portion 7*c* of the bail 7 is fitted with the other side portion 8*b* of the connecting member 8.

The other bail support member 4 includes a laterally projecting portion 4*a* formed in the front portion thereof and also a securing recessed portion 4*b* formed in the projecting portion 4*a*. One side portion 8*c* of another connecting member 8' is fitted with the securing recessed portion 4*b* of the other bail support member 4 by pressure or by other similar means.

Also, the bail 7 further includes a securing recessed portion 7*d* formed in the other side end portion 7*b* thereof. The securing recessed portion 7*d* of the bail 7 is fitted with the other side portion 8*d* of the connecting member 8' by pressure or by other similar means.

The remaining portions of the fifth embodiment are almost the same as those of the previously described first embodiment.

Figure 8:
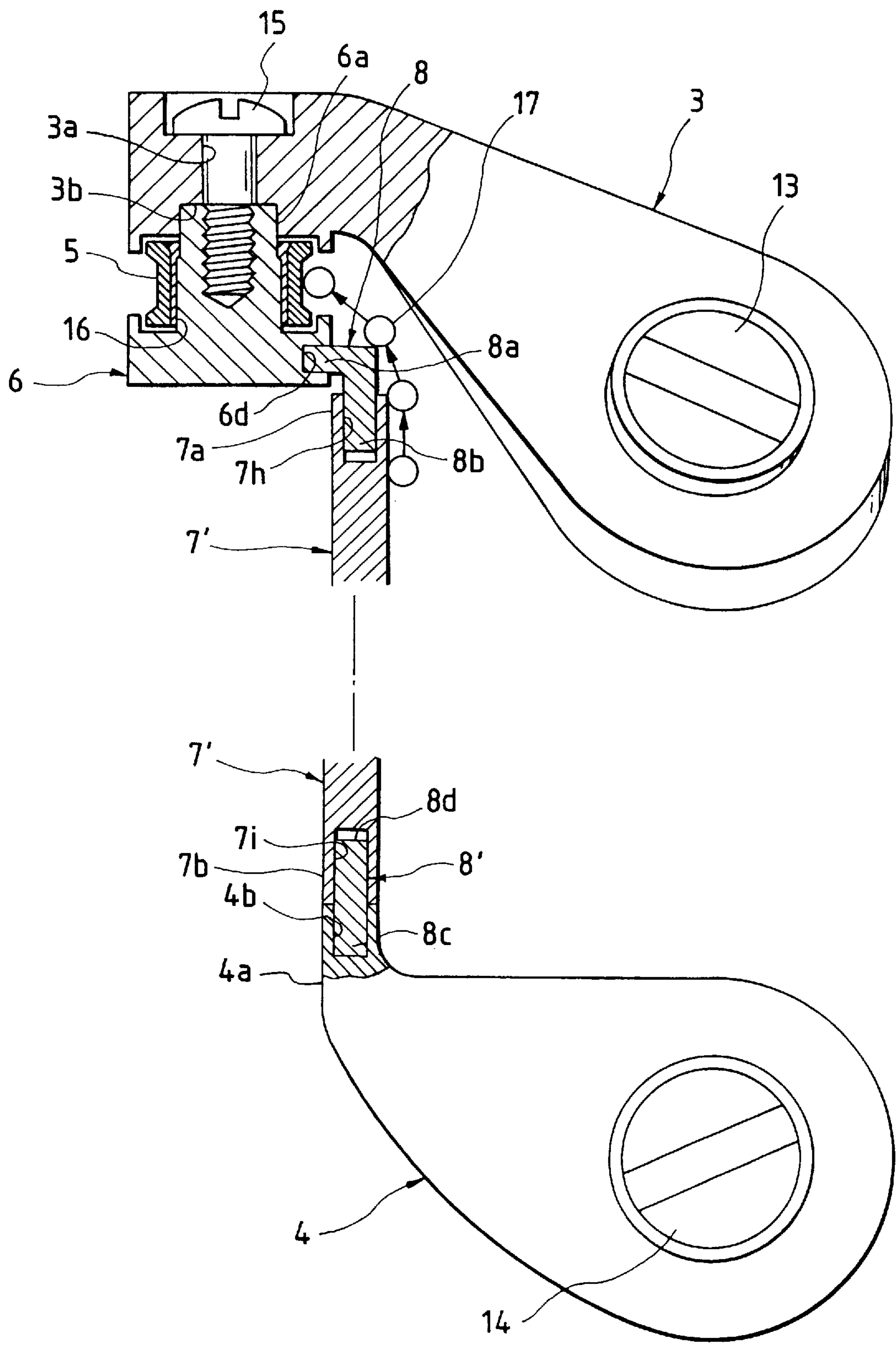
FIG. 8 is a developed sectional plan view of the main portions of a pair of bail support members employed in a sixth embodiment of the invention.

Now, in FIG. 8, there is shown a sixth embodiment of a spinning reel for fishing according to the invention and, in particular, FIG. 8 is a developed sectional plan view of the main portions of a pair of bail support members employed in the sixth embodiment.

In the sixth embodiment, the bail mounting portion 6 includes a recessed portion 6*d* formed in the outer periphery thereof. One side portion 8*a* of an L-shaped connecting member 8 is fitted with the recessed portion 6*d* of the bail mounting portion 6.

A semi-annular and solid bail 7' includes a securing recessed portion 7*h* formed in one side end portion 7*a* thereof. The securing recessed portion 7*h* of the bail 7' is fitted with the other side portion 8*b* of the connecting member 8.

The other bail support member 4 includes a laterally projecting portion 4*a* formed in the front side portion thereof and also a securing recessed portion 4*b* formed in the projecting portion 4*a*. One side portion 8*c* of another connecting member 8' is fitted with the securing recessed portion 4*b* of the other bail support member 4 by pressure or by other similar means.

Also, the bail 7' further includes a securing recessed portion 7*i* formed in the other side end portion 7*b* thereof, whereby the securing recessed portion 7*i* of the bail 7' is fitted with the other side portion 8*d* of another connecting member 8' by pressure or by other similar means.

The remaining portions of the sixth embodiment are almost the same as those of the previously described first embodiment.

Figure 9:
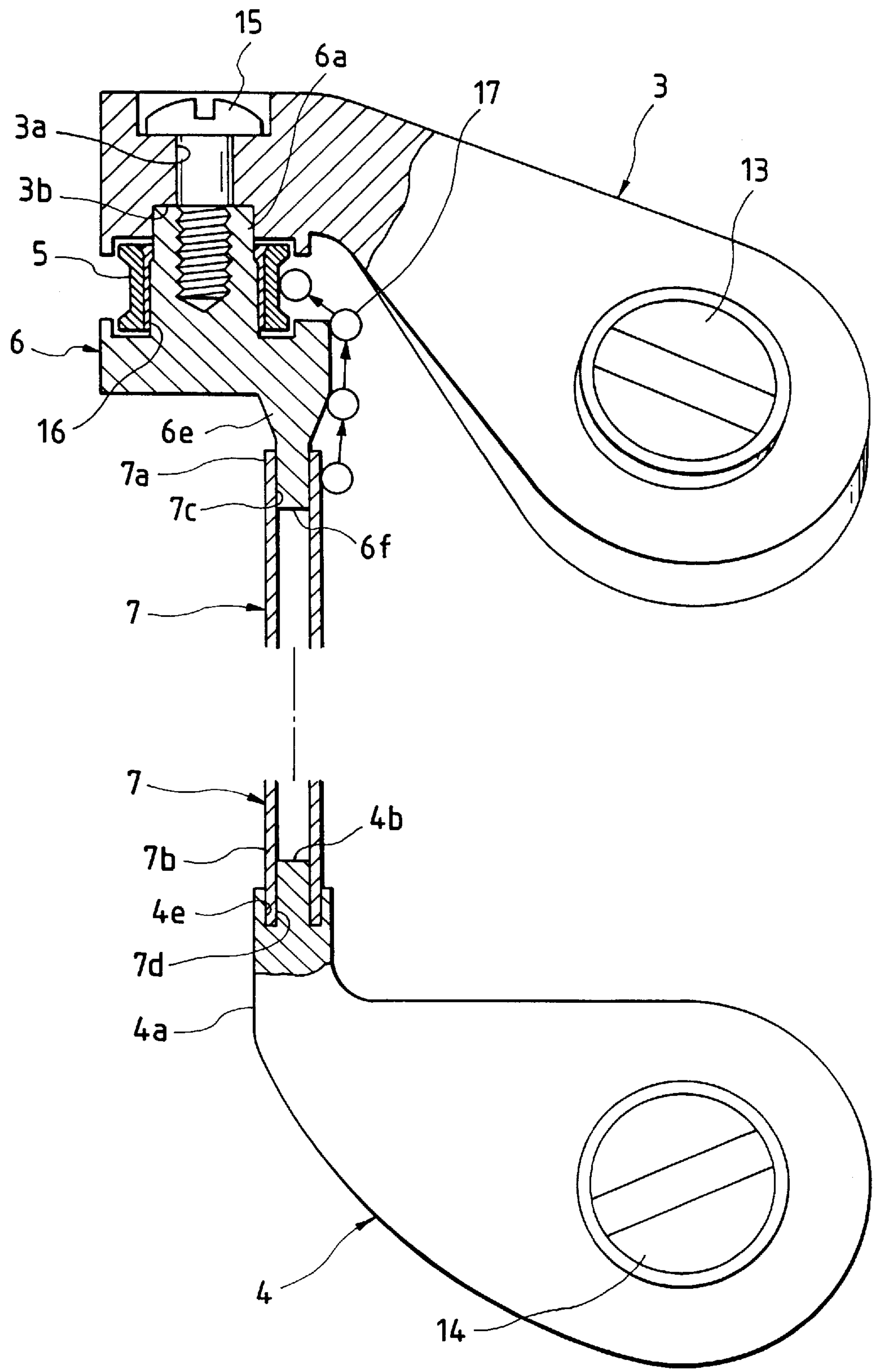
FIG. 9 is a developed sectional plan view of the main portions of a pair of bail support members employed in a seventh embodiment of the invention.

Now, in FIG. 9, there is shown a seventh embodiment of a spinning reel for fishing according to the invention and, in particular, FIG. 8 is a developed sectional plan view of the main portions of a pair of bail support members employed in the seventh embodiment.

In the seventh embodiment, the bail mounting portion 6 includes a conically-shaped, projected portion 6*e* and a securing projected portion 6*f* which are respectively formed in the outside portion thereof.

A semi-annularly-shaped and hollow bail 7 includes a securing recessed portion 7*c* formed in one side end portion 7*a* thereof. The securing recessed portion 7*c* of the bail 7 is fitted with the securing projected portion 6*f* of the bail mounting portion 6 by pressure or by other similar means.

The other bail support member 4 includes a laterally projecting portion 4*a* formed in the front side portion thereof and, in the projecting portion 4*a*, there are formed a groove-like engaging or securing recessed portion 4*e* and an engaging or securing projected portion 4*b*.

Also, the bail 7 further includes a securing recessed portion 7*d* formed in the other side end portion 7*b* thereof. The securing projected portion 4*b* of the other bail support member 4 is fitted with the inside portion of the securing recessed portion 7*d* of the bail 7 by pressure or by other similar means. The outer periphery of the other side end portion 7*b* of the bail 7 is fitted with the securing recessed portion 4*e* of the other bail support member 4 by pressure or by other similar means.

The remaining portions of the seventh embodiment are almost the same as those of the previously described first embodiment.

Figure 10:
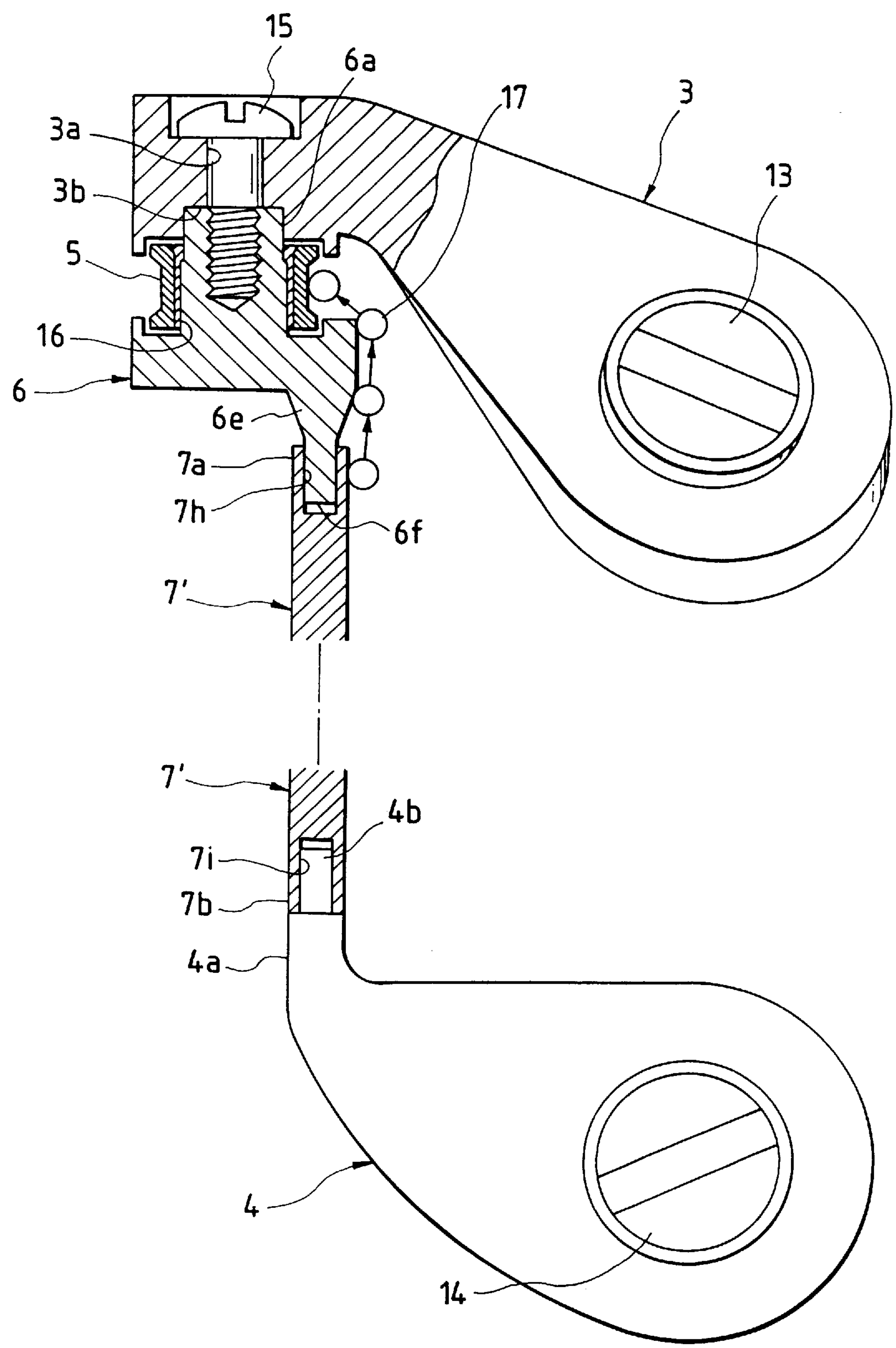
FIG. 10 is a developed sectional plan view of the main portions of a pair of bail support members employed in an eighth embodiment of the invention.

Now, in FIG. 10, there is shown an eighth embodiment of a spinning reel for fishing according to the invention and, in particular, FIG. 10 is a developed sectional plan view of the main portions of a pair of bail support members employed in the eighth embodiment.

In the eighth embodiment, the bail mounting portion 6 includes a conically-shaped projected portion 6*e* and a securing projected portion 6*f* which are respectively formed in the outside portion thereof.

On the other hand, a semi-annular and solid bail 7' includes a securing recessed portion 7*h* formed in one side end portion 7*a* thereof. The securing recessed portion 7*h* of the bail 7' is fitted with the securing projected portion 6f by pressure or by other similar means.

Further, the other bail support member 4 includes a laterally projecting portion 4*a* formed in the front side portion thereof. On the projecting portion 4*a*, there is formed an engaging or securing projected portion 4*b*.

The bail 7' further includes a securing recessed portion 7*i* formed in the other side end portion 7*b* thereof. The securing recessed portion 7*i* is fitted with the securing projected portion 4*b* of the other bail support member 4 by pressure or by other similar means.

The remaining portions of the eighth embodiment are almost the same as those of the previously described first embodiment.

Figure 11:
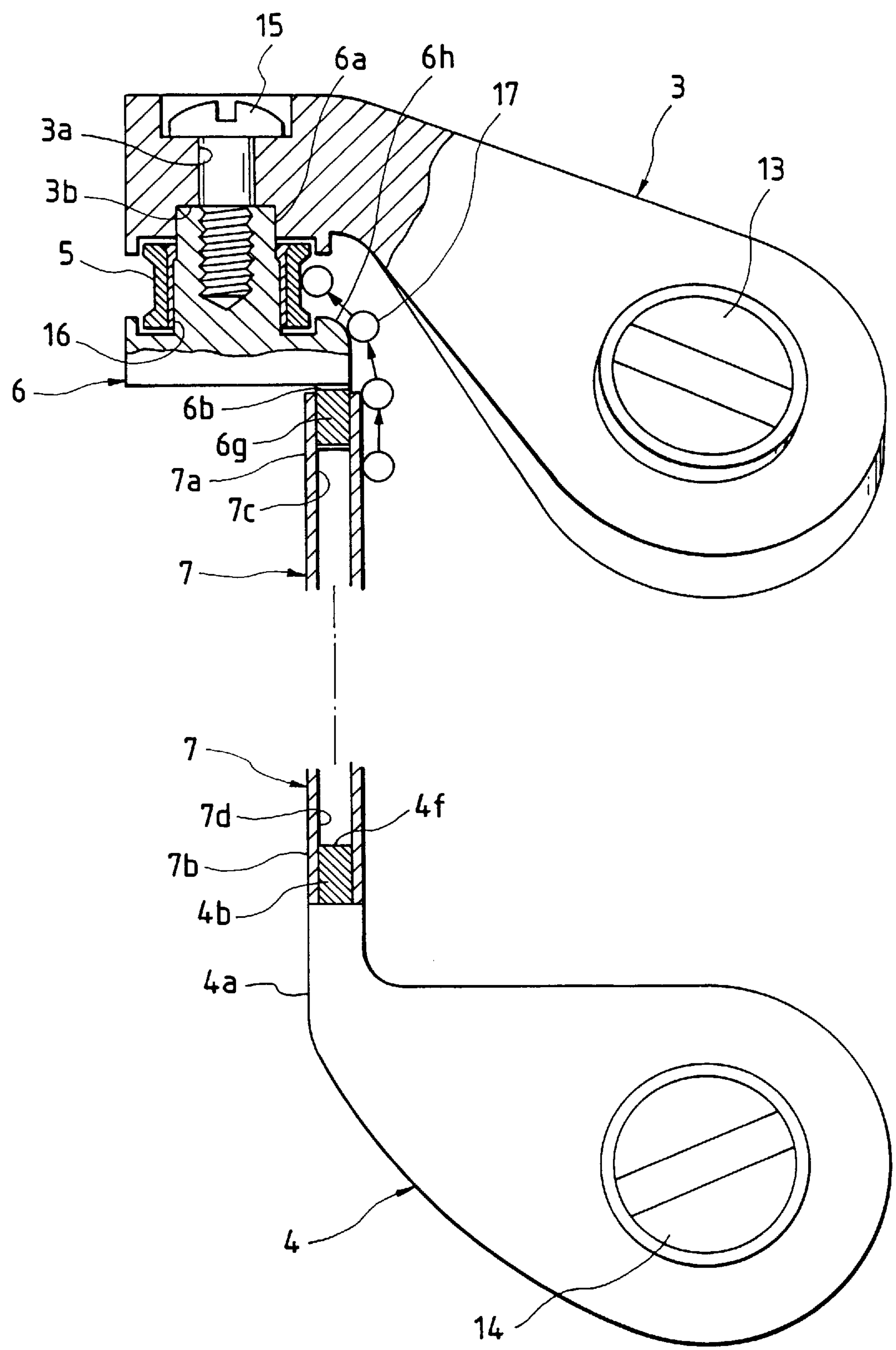
FIG. 11 is a developed sectional plan view of the main portions of a pair of bail support members employed in a ninth embodiment of the invention.

Now, in FIG. 11, there is shown a ninth embodiment of a spinning reel for fishing according to the invention and, in particular, FIG. 11 is a developed sectional plan view of the main portions of a pair of bail support members employed in the ninth embodiment.

In the ninth embodiment, the bail mounting portion 6 of the fishing line guide part A includes a securing projected portion 6*b*. In the outer periphery of the securing projected portion 6*b*, there is formed an uneven portion 6*g* by knurling.

A semi-annular and hollow bail 7 includes a securing recessed portion 7*c* formed in one side end portion 7*a* thereof. The securing recessed portion 7*c* of the bail 7 is fitted with and secured to the securing projected portion 6*b* of the bail mounting portion 6 by pressure.

The bail mounting portion 6 includes a curved surface 6*h* which is formed on one bail support member 3 side thereof.

The other bail support member 4 includes a laterally projecting portion 4*a* formed in the front side portion thereof. An engaging or securing projected portion 4*b* is formed in the projecting portion 4*a*, and there is formed by knurling an uneven portion 4*f* in the outer periphery of the securing projected portion 4*b*.

The bail 7 further includes a securing recessed portion 7*d* formed in the other side end portion 7*b* thereof, while the securing recessed portion 7*d* of the bail 7 is fitted with the securing projected portion 4*b* of the other bail support member 4 by pressure or by other similar means.

The remaining portions of the ninth embodiment are almost the same as those of the previously described first embodiment.

In the ninth embodiment, after the securing recessed portion 7*c* of the bail 7 is fitted with and secured to the securing projected portion 6*b* of the bail mounting portion 6 by pressure or by other similar means and the securing recessed portion 7*d* is fitted with and secured to the securing projected portion 4*b* of the other bail support member 4 by pressure or by similar means, even if there is applied a torsional stress, the knurled uneven portions 6*g* and 4*f* are sure to prevent removal of the associated bail mounting portion 6, bail 7 and the other bail support member 4, thereby allowing the bail support member to be reversed smoothly, so that the fishing line can be positively picked up by the bail 7.

Figure 12:
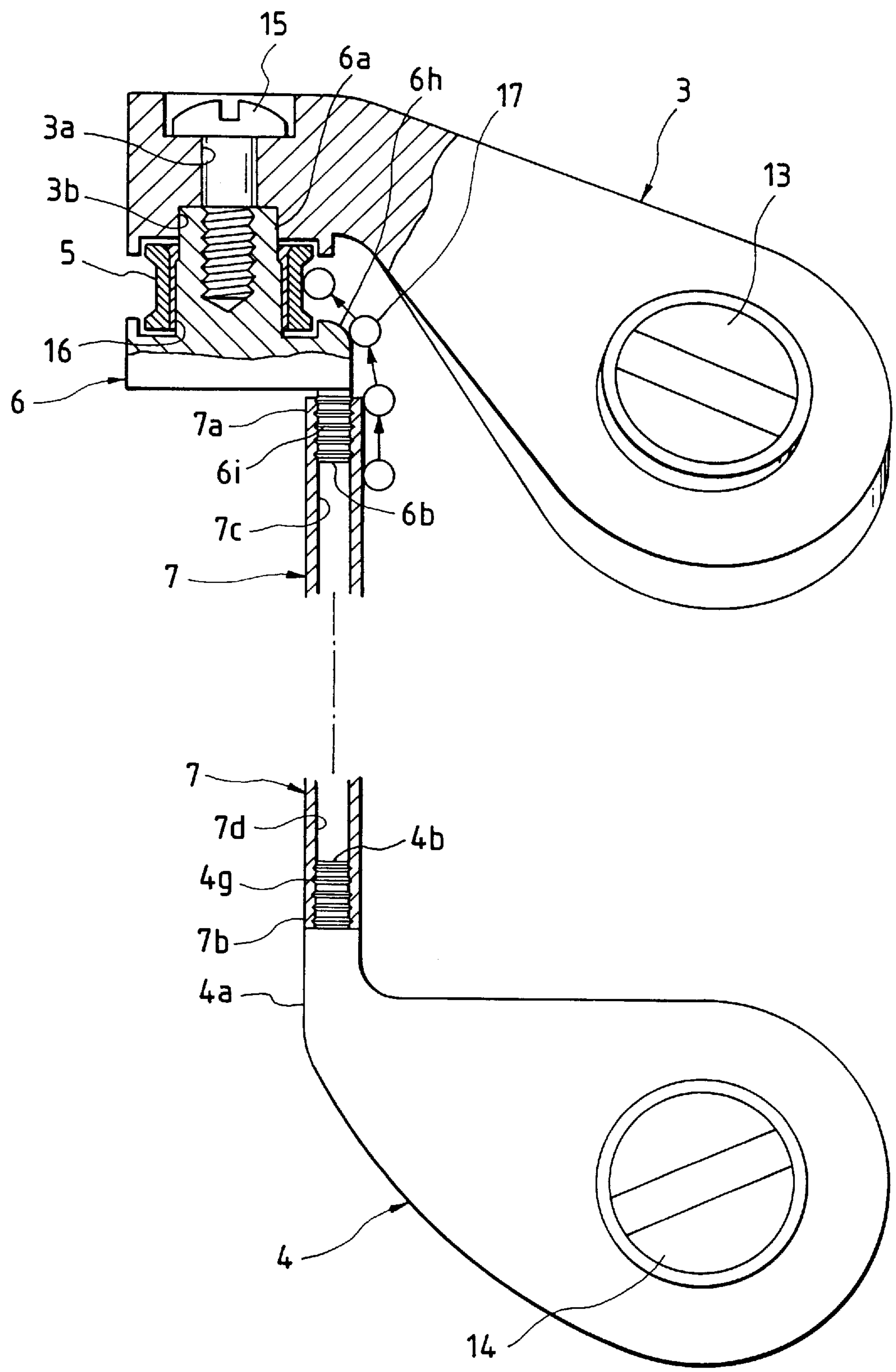
FIG. 12 is a developed sectional plan view of the main portions of a pair of bail support members employed in a tenth embodiment of the invention.

Now, in FIG. 12, there is shown a tenth embodiment of a spinning reel for fishing according to the invention and, in particular, FIG. 12 is a developed sectional plan view of the main portions of a pair of bail support members employed in the tenth embodiment.

In the tenth embodiment, there is formed a securing projected portion in the outside portion of the bail mounting portion 6 and, at the same time, there is formed by doweling an uneven portion 6*i* in the outer periphery of the securing projected portion 6*b*.

A semi-annular and hollow bail 7 includes a securing recessed portion 7*c* formed in one side end portion 7*a* thereof, the securing recessed portion 7*c* of the bail 7 is fitted with and secured to the securing projected portion 6*b* of the bail mounting portion 6 by pressure.

The other bail support member 4 includes a laterally projecting portion 4*a* formed in the front side portion thereof. Also, there is formed an engaging or securing projected portion 4*b* in the projecting portion 4*a*, and there is formed by doweling an uneven portion 4*g* in the outer periphery of the securing projected portion 4*b*.

The bail 7 further includes a securing recessed portion 7*d* formed in the other side end portion 7*b* thereof the securing recessed portion 7*d* of the bail 7 is fitted with and secured to the securing projected portion 4*b* of the other bail support member 4 by pressure or by other similar means.

The remaining portions of the tenth embodiment are almost the same as those of the previously described first embodiment.

Figure 13:
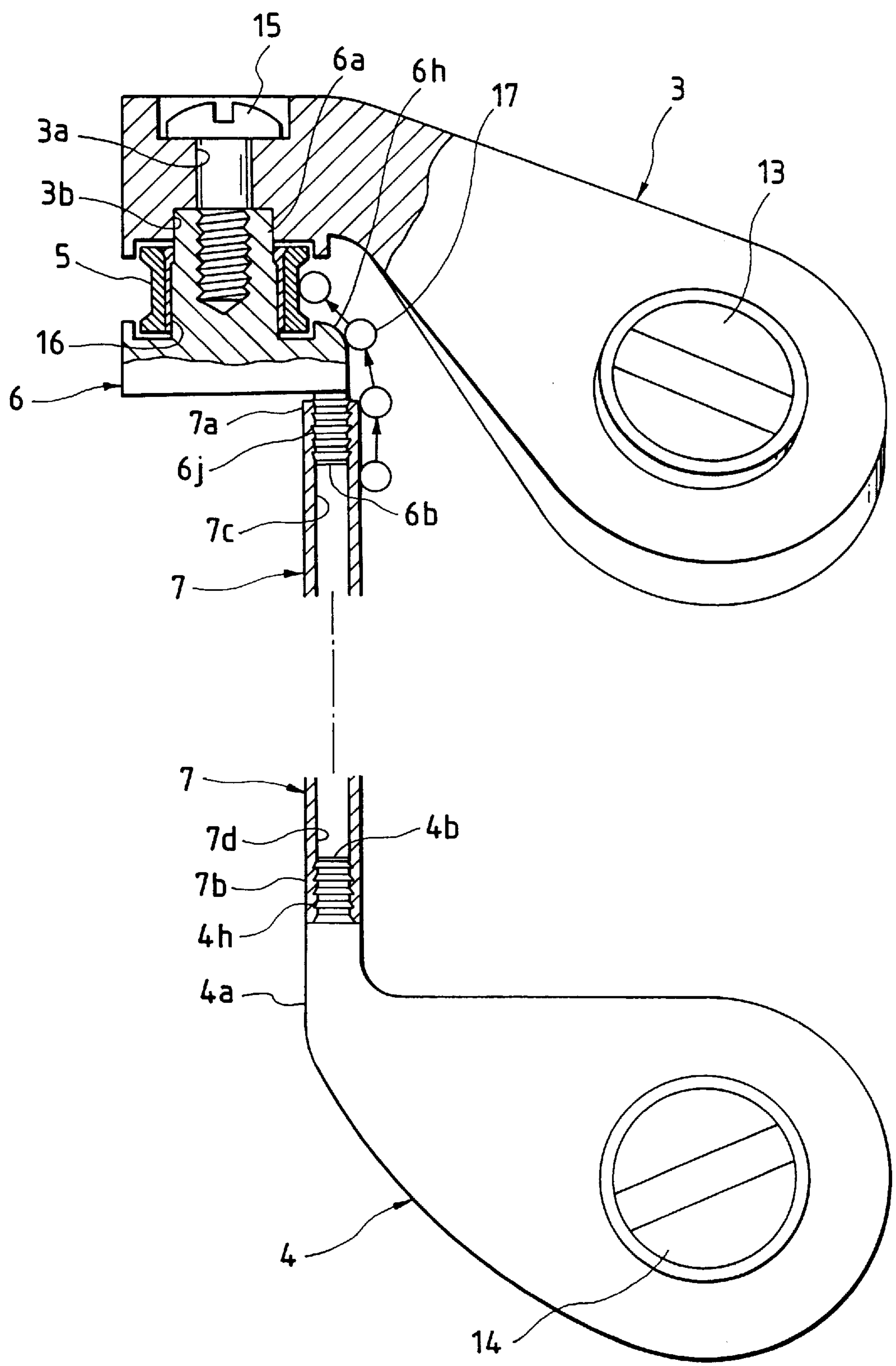
FIG. 13 is a developed sectional plan view of the main portions of a pair of bail support members employed in an eleventh embodiment of the invention.

Now, in FIG. 13, there is shown an eleventh embodiment of a spinning reel for fishing according to the invention and, in particular, FIG. 13 is a developed sectional plan view of the main portions of a pair of bail support members employed in the eleventh embodiment.

In the eleventh embodiment, there is formed a securing projected portion 6*b* in the outside portion of the bail mounting portion 6, while a hook-shaped uneven portion 6*j* is formed by doweling in the outer periphery of the securing projected portion 6*b*.

A semi-annular and hollow bail 7 includes a securing recessed portion 7*c* formed in one side end portion 7*a* thereof. The securing recessed portion 7*c* is fitted with and secured to the securing projected portion 6*b* of the bail mounting portion 6 by pressure.

The other bail support member 4 includes a laterally projecting portion 4*a* in the front side portion thereof an engaging or securing projected portion 4*b* is formed in the projecting portion 4*a*, and a hook-shaped uneven portion 4*h* is formed by doweling in the outer periphery of the securing projected portion 4*b*.

The bail 7 further includes a securing recessed portion 7*d* in the other side end portion 7*b* thereof. The securing recessed portion 7*d* is fitted with and secured to the securing projected portion 4*b* by pressure or by other similar means.

The remaining portions of the eleventh embodiment are almost the same as those of the previously described first embodiment.

Figure 14:
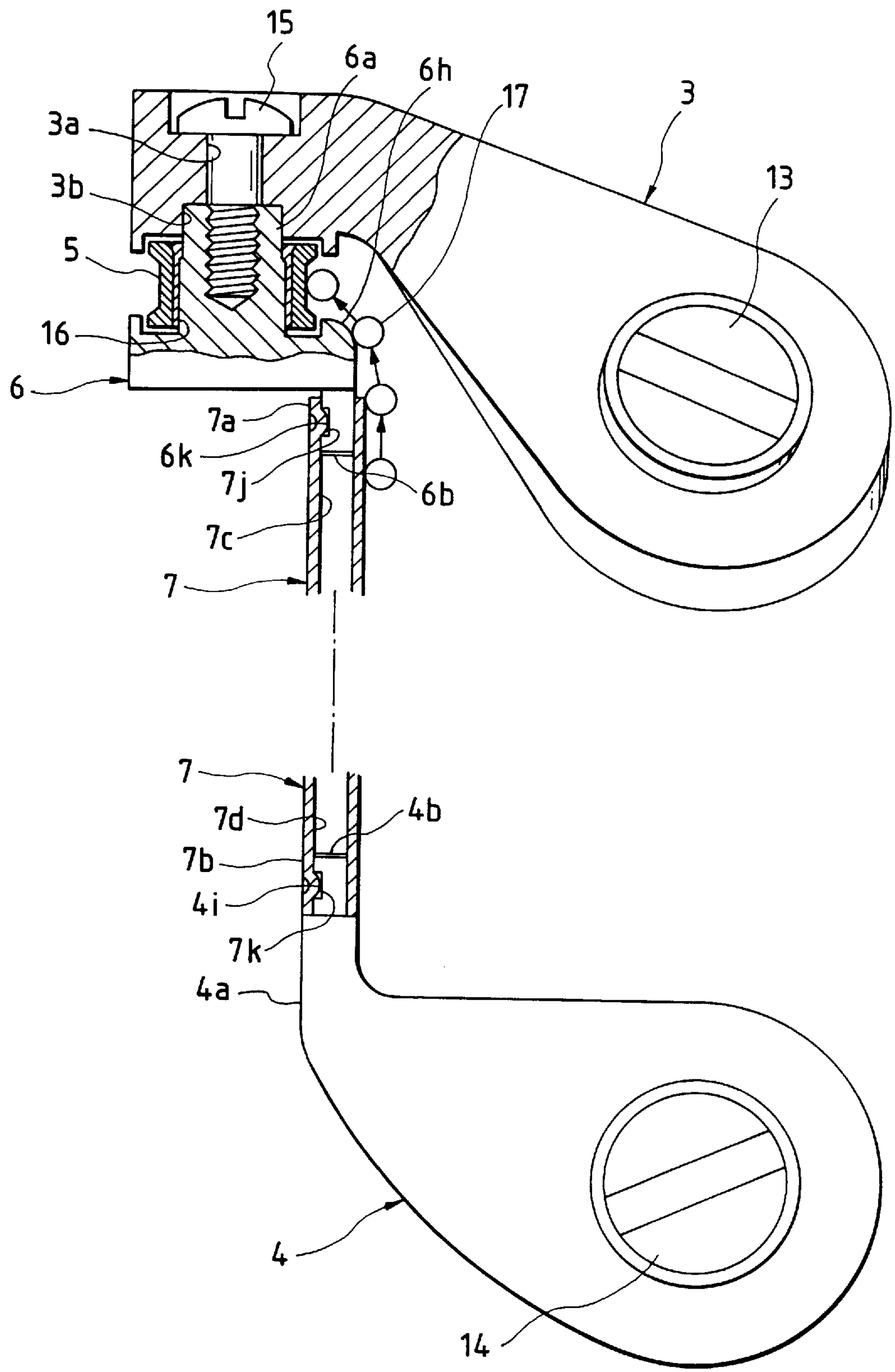
FIG. 14 is a developed sectional plan view of the main portions of a pair of bail support members employed in a twelfth embodiment of the invention.

Now, in FIG. 14, there is shown a twelfth embodiment of a spinning reel for fishing according to the invention and, in particular, FIG. 14 is a developed sectional plan view of a pair of bail support members employed in the twelfth embodiment.

In the twelfth embodiment, there is formed a securing projected portion 6*b* in the outside portion of the bail mounting portion 6. An uneven portion 6*k* is formed in the outer periphery of the securing projected portion 6*b* by notching.

A semi-annular and hollow bail 7 includes a securing recessed portion 7*c* in one side end portion 7*a* thereof. The securing recessed portion 7*c* is fitted with and secured to the securing projected portion 6*b* of the bail mounting portion 6. Also, the bail 7 further includes a projected portion 7*j* which is formed by punching on the opposite side of the bail 7 to the side thereof where the fishing line is to be picked up.

The other bail support member 4 includes a laterally projecting portion 4*a* formed in the front side portion thereof. An engaging or securing projected portion 4*b* is formed therein and an uneven portion 4*i* is formed in the outer periphery of the securing projected portion 4*b* by notching.

The other bail support member 4 further includes a securing recessed portion 7*d* formed in the other side end portion 7*b* thereof. The securing recessed portion 7*d* is fitted with and secured to the securing projected portion 4*b* by pressure or by other similar means. Also, the bail 7 further includes a projected portion 7*k* which is formed by punching on the opposite side to the side thereof where the fishing line is picked up.

The remaining portions of the twelfth embodiment are almost the same as those of the previously described first embodiment.

Figure 15:
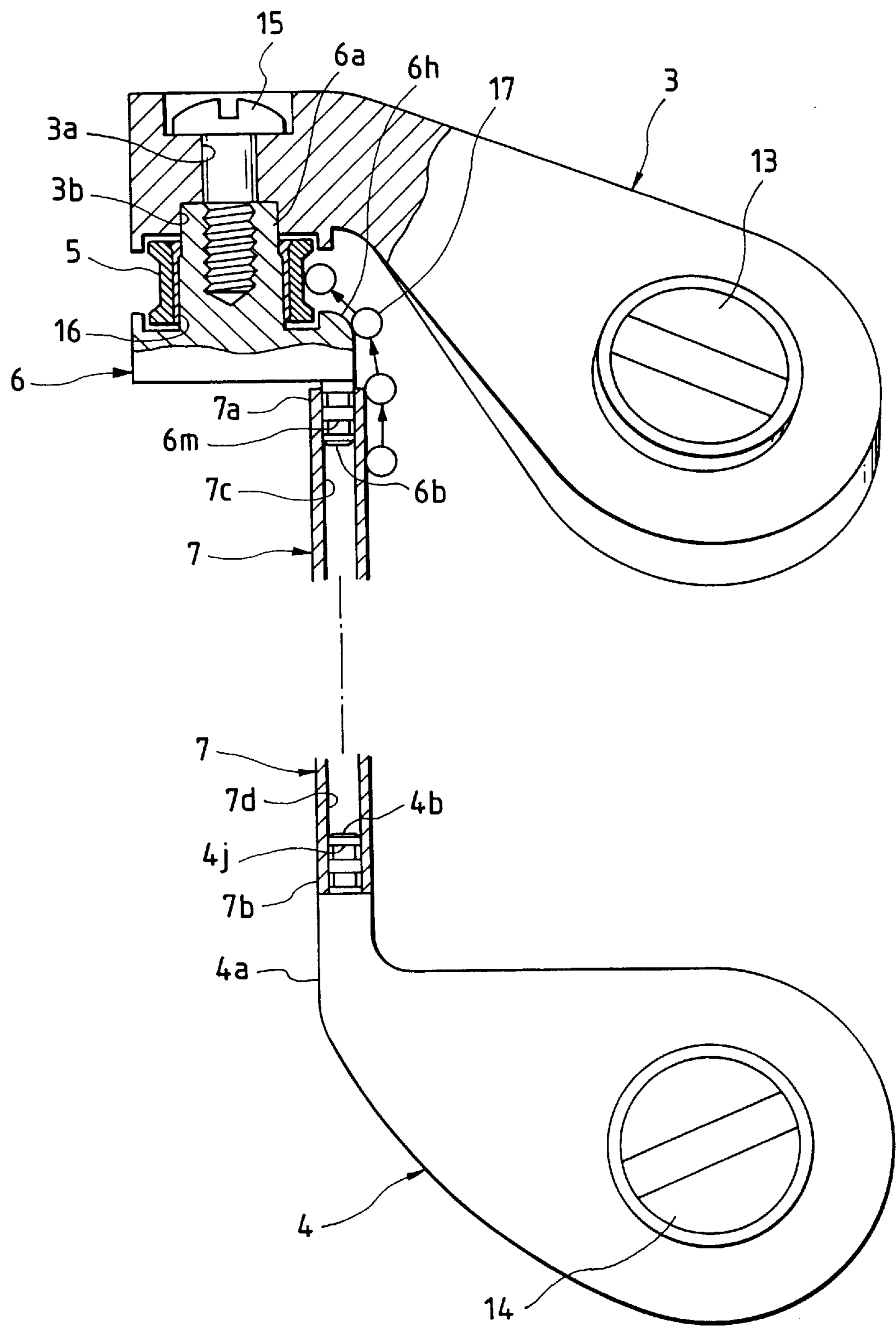
FIG. 15 is a developed sectional plan view of the main portions of a pair of bail support members employed in a thirteenth embodiment of the invention.

Now, in FIG. 15, there is shown a thirteenth embodiment of a spinning reel for fishing and, in particular, FIG. 15 is a developed sectional plan view of a pair of bail support members employed in the thirteenth embodiment.

In the thirteenth embodiment, there is formed a securing projected portion 6*b* in the outside portion of the bail mounting portion 6. On the outer periphery of the securing projected portion 6*b*, there is formed an uneven portion 6*m* which consists of several outer peripheral grooves.

A semi-annular and hollow bail 7 includes a securing recessed portion 7*c* formed in one side end portion 7*a* thereof the securing recessed portion 7*c* is fitted with and secured to the securing projected portion 6*b* by pressure and is also bonded thereto by an adhesive.

The other bail support member 4 includes a laterally projecting portion 4*a* formed in the front side portion thereof. An engaging or securing projected portion 4*b* is formed in the projecting portion 4*a*, and, in the outer periphery of the securing projected portion 4*b*, there is formed an uneven portion 4*j* which consists of several outer peripheral grooves.

The bail 7 further includes a securing recessed portion 7*d* formed in the other side end portion 7*b* thereof. The securing recessed portion 7*d* is fitted with and secured to the securing projected portion 4*b* by pressure and is also bonded thereto by an adhesive.

The remaining portions of the thirteenth embodiment are almost the same as those of the previously described first embodiment.

Figure 16:
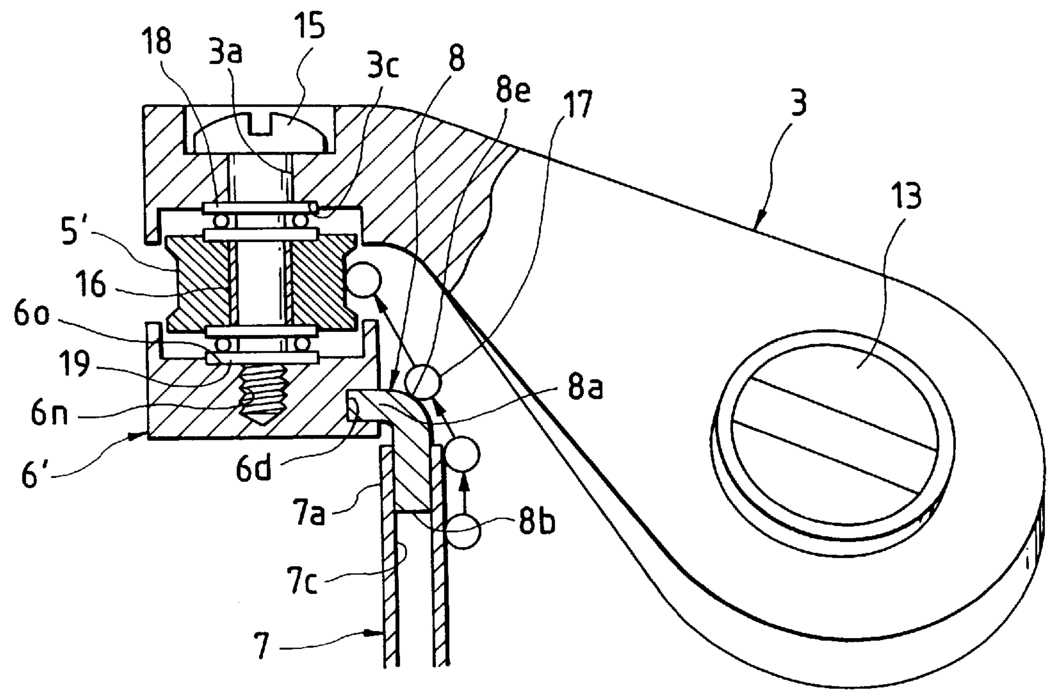
FIG. 16 is a developed sectional plan view of the main portions of a pair of bail support members employed in a fourteenth embodiment of the invention.

Now, in FIG. 16, there is shown a fourteenth embodiment of a spinning reel for fishing according to the invention and, in particular, FIG. 16 is a developed sectional plan view of a pair of bail support members employed in the fourteenth embodiment.

In the fourteenth embodiment, a fishing line guide roller 5' provided in the fishing line guide part A is mounted together with a bail support portion 6' to one bail support member 3 by a screw 15, with thrust ball bearings 18 and 19 interposed between them.

In the leading end portion of one bail support member 3, there are formed a through hole 3*a* and a recessed portion 3*c* into which part of the thrust ball bearing 18 can be fitted. Also, a screw 15 is inserted through the through hole 3*a*, thrust ball bearing 18, fishing line guide roller 5' and thrust ball bearing 19. The screw 15 is further threadedly engaged with a screw hole 6*n* formed in the bail mounting portion 6'.

In the bail mounting portion 6', there is formed a recessed portion 60 into which part of the thrust ball bearing 19 can be fitted.

The fishing line guide roller 5' is rotatably fitted with the outer periphery of the shaft portion of the screw 15 with a shaft cylinder 16 interposed between them.

On the two sides of the fishing line guide roller 5', there are formed two recesses into which the thrust ball bearings 18 and 19 can be in part fitted respectively.

The bail mounting portion 6' includes a recessed portion 6*d* formed in the outer periphery thereof, while one side portion 8*a* of an L-shaped connecting member 8 is fitted into the recessed portion 6*d*.

A semi-annular and hollow bail 7 includes a securing recessed portion 7*c* formed in one side end portion 7*a* thereof. The securing recessed portion 7*c* is fitted with the other side portion 8*b* of the connecting member 8.

The surface of the connecting member 8 against which a fishing line 17 can be butted is formed in a curved surface 8*e*.

The other bail support member is so arranged as to have any one of the above-mentioned structures, while the other side end portion of the bail 7 is fitted with and secured to the other bail support member 4.

The remaining portions of the fourteenth embodiment are almost the same as those of the previously described first embodiment.

Figure 17:
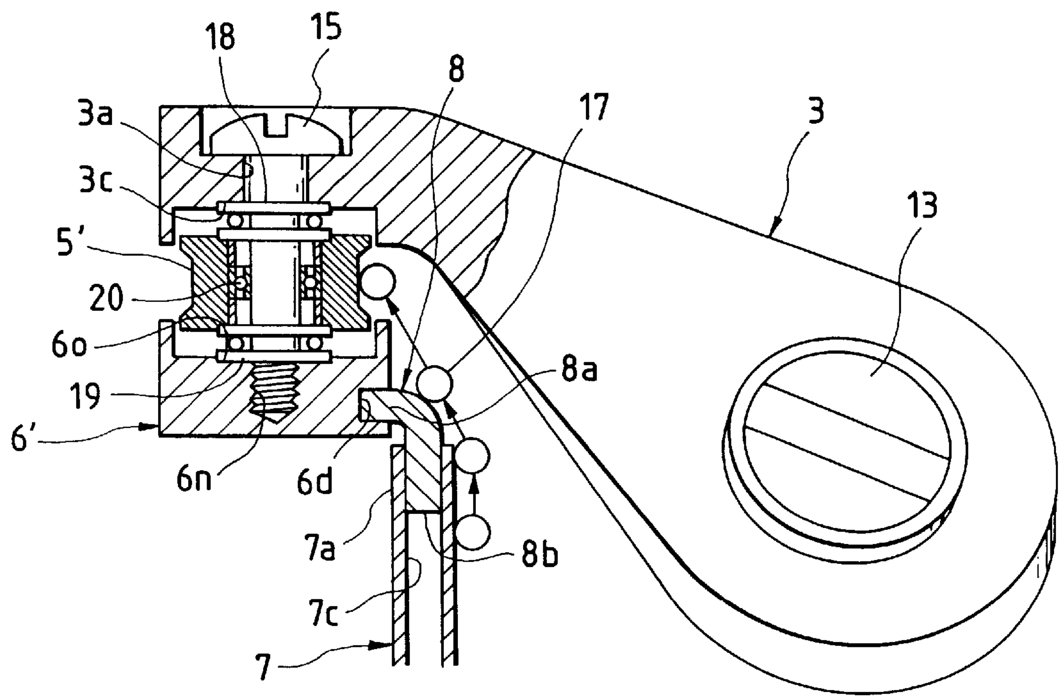
FIG. 17 is a developed sectional plan view of the main portions of a pair of bail support members employed in a modification of the fourteenth embodiment of the invention; and, FIG. 18 is a developed sectional plan view of the main portions of a pair of bail support members employed in a conventional spinning reel for fishing.
Figure 18:
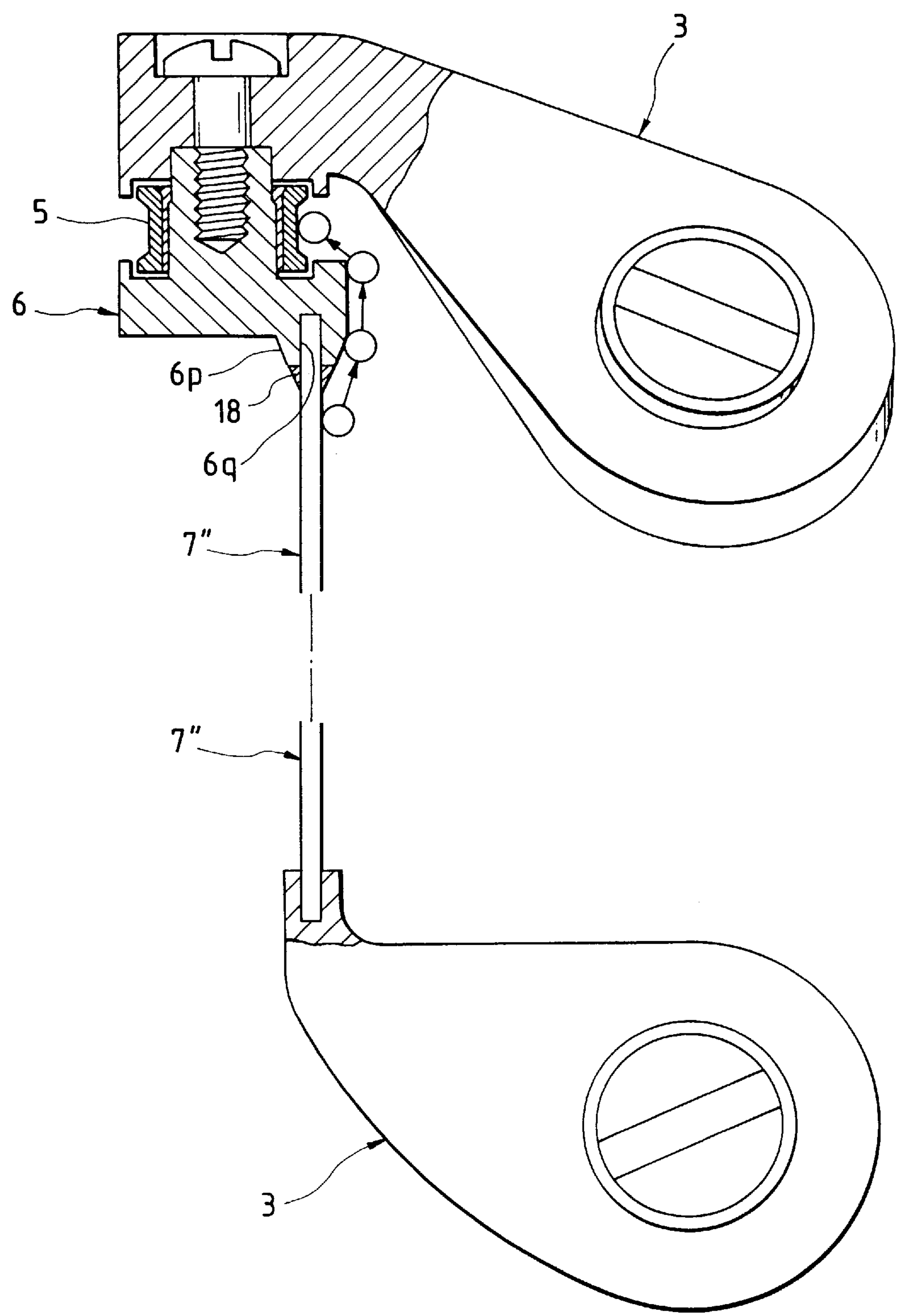

Now, in FIG. 17, there is shown a modification of the above-mentioned fourteenth embodiment and, in particular, FIG. 17 is a developed sectional plan view of a pair of bail support members employed in the present modification.

In the modification of the fourteenth embodiment, a fishing line guide roller 5' is fitted with the outer periphery of the shaft portion of the screw 15 with a radial ball bearing 20 interposed between them.

The remaining portions of the present modification are almost the same as those of the fourteenth embodiment.

In the above-mentioned description, the securing projected portions are formed in distally projecting portions of the bail mounting portions 6, 6', the other bail support member 4, and the connecting members 8, 8', while the securing recessed portions are formed in side end portions 7*a* and/or in the other side end portions 7*b* of the bails 7, 7'. The above description of the preferred embodiments has been given by way of example. From the disclosure given, those skilled in the art will not only understand the present invention and its attendant advantages, but will also find apparent various changes and modifications to the structures disclosed. It is sought to cover all such changes and modifications as fall within the spirit and scope of the invention, as defined by the appended claims, and equivalents thereof.

As described above, the present invention can provide effects as follows:

Since the bail mounting portion and bail are fixed to each other in such a manner that a securing projected portion formed in one of them is fitted with a securing recessed portion formed in the other, the function of the present fishing line guide device can be maintained stably and surely for a long period of time by means of a simple structure without causing any clattering.

A fishing line picked up by the bail can be positively guided to the fishing line guide roller of the fishing line guide part without being caught by the securing recessed portion or securing projected portion, so that a fishing line take-up operation can be carried out comfortably.

Since there are formed uneven portions respectively in the outer peripheries of the securing projected portions of the bail mounting portion and the other bail support member since a securing recessed portion formed in the end portion of the bail is fitted with and secured to the uneven portions, even if there is applied a torsional stress, the bail mounting portion, the other bail support member and bail can be reliably prevented from being detached from each other, so that the fishing line can be picked up by the bail positively.

What is claimed is:

1. A bail mounting structure for mounting a bail onto a bail support member in a fishing, spinning reel, the bail mounting structure comprising:

a securing recessed portion comprising a hollow cylindrical portion formed in an end portion of the bail; and a securing projected portion provided on a mounting portion of the bail support member and securely inserted into the securing recessed portion;

wherein the end portion of the bail defines an outer circumference that is substantially equal to an outer circumference along an entire axial length of the bail.

2. A bail mounting structure according to claim 1, wherein the securing projected portion is integral with the mounting portion of the bail support member.

3. A bail mounting structure according to claim 1, wherein the securing projected portion is fixed to the mounting portion of the bail support member as a non-integral element.

4. A bail mounting structure according to claim 1, wherein the securing projected portion comprises a circular column received by an inner cylindrical surface of the hollow cylindrical portion.

5. A bail mounting structure according to claim 1, wherein an outer peripheral surface of the end portion of the bail is located radially outwardly of the securing projected portion.

6. A bail mounting structure according to claim 1, wherein an outer periphery of the securing projected portion comprises a plurality of surface depressions, and is received by an inner cylindrical surface of the securing recessed portion.

7. A bail mounting structure according to claim 1, wherein the securing projected portion and the mounting portion of the bail support member cooperatively define a step contacting an axial terminus of the end portion of the bail.

8. A bail mounting structure according to claim 1, wherein an outer periphery of the securing projected portion comprises a plurality of surface protrusions, and is received by an inner cylindrical surface of the securing recessed portion.

9. A bail structure for a spinning reel for fishing, comprising:

a bail extending from a first end portion to a second end portion, the end portions defining axial terminuses of said bail, said bail having two securing recessed portions formed respectively in the end portions of said bail, each securing recessed portion comprising a hollow cylindrical portion whereby said bail, including the end portions, has a substantially constant outer circumference; and a first bail support member comprising a mounting portion having a first securing projected portion projecting from the mounting portion and supporting said bail at one of the end portions of said bail by means of the first securing projected portion;

a second bail support member having a second securing projected portion projecting from said support member and supporting said bail at the other of the end portions of said bail by means of the second securing projected portion;

wherein the first and second securing projected portions are respectively securely inserted into the securing recessed portions of said bail.

10. A bail mounting structure for mounting a bail onto a bail support member in a fishing, spinning reel, the bail mounting structure comprising:

a securing recessed portion formed in an end portion of the bail; and a securing projected portion provided on a mounting portion of the bail support member and securely inserted into said securing recessed portion, said securing projected portion being offset from a rotational axis of a fishing line guide roller provided in the bail support member.

11. A bail mounting structure according to claim 10, wherein the securing recessed portion comprises a hollow cylindrical portion formed in an end portion of the bail.

* * * * *